July 13, 1971   G. B. WATTLES ET AL   3,592,720
WELT CORD
Filed Aug. 11, 1967   2 Sheets-Sheet 1

INVENTORS
Gurdon B. Wattles
and Herbert S. Sneiderman
BY Paris, Haskell & Levine
ATTORNEYS

United States Patent Office 3,592,720
Patented July 13, 1971

3,592,720
WELT CORD
Gurdon B. Wattles and Herbert S. Sneiderman, New Haven, Conn., assignors to American Manufacturing Company, Inc., Brooklyn, N.Y.
Filed Aug. 11, 1967, Ser. No. 659,969
Int. Cl. B32b 3/04, 3/26; B29d 27/00
U.S. Cl. 161—101                                    12 Claims

ABSTRACT OF THE DISCLOSURE

A welt cord core is described, formed of a foamed synthetic thermoplastic resin. The core material has a very high percent of voids (70% to 80%) and very small average pore size (8 mils to 25 mils), and provides a soft and resilient welt cord that suffers only slight deformation on cornering. Specific resins disclosed are EEA, EVA, and polyethylene.

---

The present invention relates to welt cord, and particularly to a welt cord having an improved core, and to a method of making the core stock material.

Welt cord is frequently employed in the formation of seams joining pieces of fabric, such as cloth, leather, plastic, or other sheet material, to cover the seam stitching for aesthetic and protective purposes, and to lend strength to the seam. It is also frequently employed as an edging to provide a finished appearance and/or body to a piece of sheet fabric. In its most common form, welt cord comprises a rod-like core encased in a covering that may be selected to be the same as the sheet material with which the cord is to be used, or may be selected to be of a contrasting color or texture. This covering is formed to provide an edge along the length of the welt cord that is sewn into the seam stitching when the cord is used as a seam covering, leaving the core filled rib portion of the welt cord overlying and concealing the seam. When used as an edging, the welt cord is similarly affixed along the edge of the fabric, so that the core filled section of the cord provides a decorative or finished appearance to the edge of the fabric.

For many welt cord uses, it is desirable that it be both soft and resilient. This property is particularly desirable in many furniture upholstery applications, particularly when used as a seam covering for cushions and upholstered seating areas of chairs. A further desideratum in such environments is that the welt cord be able to follow curved contours and sharp bends, such for example as 90° corners, and still retain its shape substantially undistorted in order to provide a maximum aesthetic value. Both these features are in large measure a function of the core material used. A twisted paper or twine core is perhaps the core material most commonly used, because of its cheapness. However, this core is not possessed of any of the foregoing properties. It is neither soft, resilient, or capable of being bent over a sharp corner without distortion. In an effort to succeed in obtaining these desirable features, it has been proposed to utilize cores of foamed rubber and foamed synthetic resin plastics. These core materials have provided the resiliency desired, and they do to some extent improve the ability of the welt cord to be cornered. An example of a foamed plastic welt cord core is shown and described in U.S. Pat. 2,932,121, to E. W. Weitzel. As there illustrated, when this type of material is bent about a sharp 90° turn, the inside portion of the core collapses, thereby reducing the diameter of the welt cord in that area.

In accordance with the present invention, it has been found that foamed synthetic resin cores can be provided which when carried around a sharp 90° bend, even one having an inside radius of curvature close to, and even substantially equal to zero, do not collapse, and maintain a substantially uniform cross section all along the curvature. In addition, it is found that this core material provides a better combination of resiliency and softness than has heretofore been obtained for welt cords. This welt cord core material obviously therefore represents a substantial improvement over the prior art welt cord cores. It is thought that this ability to follow a sharp angle curvature, as well as the improved resilience and softness properties, result from a combination of properties in the welt cord core, particularly the porosity of the foamed core material, the size of the pores, and the elasticity of the core material.

In particular it has been found that the foregoing results are obtained with foamed ethylene-ethylacrylate (EEA) and with foamed ethylene-vinyl acetate (EVA), and with foamed blends of EEA or EVA with a minor percentage of polyolefins, such as polypropylene. The physical properties of these foamed welt cord cores are that they possess roughly 70% voids with an average pore size of about 25 mils in diameter, and they are moderately elastic, permitting from about 4% to about 12% elastic deformation, depending on the percentage of polyolefin employed—the greater the percentage of polyolefin, the less the elasticity. Thus the presence of the polyolefin tends to increase the stiffness, and it is found that this increase in stiffness does slightly decrease the sharpness of curvature to which the cord may be subjected without collapsing on the inside portion of the curvature.

It has further been found that the increased stiffness resulting from the presence of a polyolefin can be overcome, at least in large measure, by increasing the percent of voids in the foamed core, and by reducing the average pore size. These latter properties tend to increase the elasticity of the resultant foamed material, and result in properties closely analogous to the EVA and EEA materials. For instance, it was found that a polyethylene foam core provided properties substantially similar to the previously described EEA and EVA materials, when foamed under conditions to produce approximately 80% voids and an average pore size of about 8 mils. This core material provided on elastic deformation of up to about 11%, had resilience and softness qualities similar to the EVA and EEA cores, and permitted cornering with almost as uniform diameter as did said other core materials.

Production of the foregoing foamed materials requires special handling because of the high percentage of voids. The core material was formed in an essentially conventional extruder, but operating parameters must be maintained so as to be certain that extrusion through the die orifice is controlled by extruded pressure and not by blowing agent for pushing the extrudate through the die. Also, careful control of the extrudate cooling is important. These processing parameters must be carefully controlled, otherwise the properties desired will not be obtained.

It is accordingly one object of the present invention to provide a welt cord having a core which is both soft and resilient and is capable of being subjected to a very short radius of curvature, with a substantially uniform diameter along the curvature and without collapsing at the inside of the curvature.

Another object of the present invention is to provide such a welt cord wherein the core is formed of a foamed synthetic resin plastic.

Another object of the present invention is to provide such a welt cord wherein the core is formed of a foamed plastic consisting primarily of EEA or EVA.

Another object of the present invention is to provide a welt cord wherein the core is formed of a foamed polyolefin, particularly a lower chain monomer such as polyethylene or polypropylene.

Still another object of the present invention is to provide for the formation of the foregoing welt cord core materials.

Other objects and advantages of the present invention will be apparent to those skilled in the art from a consideration of the following exemplary specific examples of the invention, had in conjunction with accompanying drawings, in which like numerals refer to like or corresponding parts, and wherein.

Figure 1:
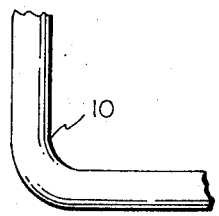
FIG. 1 is an illustration of the welt cord core of the present invention bent about a sharp 90° curvature.
Figure 2:
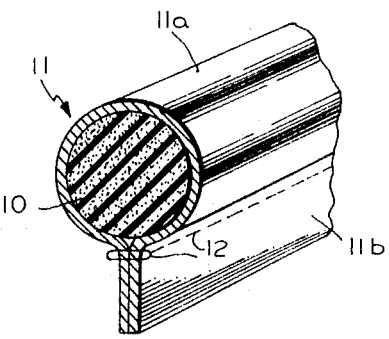
FIG. 2 is a cross sectional and perspective view of a welt cord.

Referring to the drawings, the uncovered welt cord core of the present invention is shown in FIG. 1 and is designated by the numeral 10. In the preferred form of the invention this core material may be an extruded foamed length of plastic of round cross section usually ranging in diameter between $\frac{2}{32}$ and $\frac{8}{32}$ of an inch. Obviously, other cross sectional shapes and sizes may be employed as desired. In accordance with one aspect of the present invention, this core material is formed of foamed EVA or EEA, which may be blended with a minor percentage of up to about 10% of a polyolefin, such as polypropylene, and may also include a minor percentage of usual fillers and other additives. In accordance with a further aspect of the invention, this core 10 may be a foamed polyolefin, such as polyethylene or polypropylene.

More specifically, optimum cornering or bend properties (i.e., substantially uniform diameter and shape over the curvature, as shown in FIG. 1) have been obtained by extruding a mixture of EEA having an ASTM melt flow of 6.0 (test D1238), containing 1% Kempore (azobisformamide, a nitrogen generator commonly used as a blowing or foaming agent for synthetic resins) sizes 125 and 200. The EEA and Kempore were blended in the usual way, such as in a tumble mill or ball mill to obtain a good dispersion of the Kempore in the EEA, and then extruded. The resultant core material was a foam containing about 70% voids, wherein the average pore size was about 25 mils, having an elastic deformation of between about 8.3 and 12.5%, an elongation to break of approximately 450% for a $\frac{5}{32}$ inch diameter sample, and a tensile strength of about 265 p.s.i.

Substantially equal cornering properties, i.e., ability to hold a uniform diameter when subjected to a sharp curvature or bend, were obtained with a core formed in the same way as the preceding example, except using EVA instead of EEA. This foamed product likewise contained about 70% voids, an average pore size of about 25 mils in diameter, and had an elastic deformation of between about 8.3 and 12.5%. Its elongation to break was over 500% for $\frac{5}{32}$ inch diameter sample, and its tensile strength was approximately 290 p.s.i.

Nearly equivalent results are obtained when small percentages of a polyolefin, such as polypropylene, are added to the EEA or EVA, with or without fillers, such as talc, asbestos, or silica. The addition of the polypropylene diminishes the elastic deformation limits of the material, and diminishes to a small extent the ability of the core material to hold a uniform cross sectional diameter and shape on a sharp 90° bend. For example, with a blend of EEA and 5% linear polypropylene the elastic deformation limit was reduced to between about 6.2 and 8.3%. With a blend of EEA and 10% linear polypropylene the elastic deformation limit was between about 4.1 and 6.2%, the tensile strength was about 268 p.s.i., and the elongation to break was about 420% for a $\frac{5}{32}$ inch diameter sample.

In accordance with still another embodiment of the invention, the core 10 was formed entirely of polyethylene. Although the cornering property is not quite as good as in the foregoing specific examples, considering the reduced costs, and the presence of but a very slight tendency for the core to collapse on a sharp 90° bend, this core material is substantially improved over the above noted Weitzel material. It was found that these improved properties are obtainable with polyethylene if the core material contains a substantially greater percent of voids, and if these voids are substantially smaller than is the case with the preceding embodiments. Specifically, the present embodiment of core 10 is an extruded rod of foamed polyethylene formed from stock polyethylene having a melt index of 0.45 and a density of 0.916. The polyethylene was blended with 1.6% of said Kempore blowing agent, and extruded under foam forming conditions. The resultant foamed core material contained about 80% voids, wherein the average pore size was about 8 mils in diameter. This material had a tensile strength of about 180 p.s.i., an elongation to break of about 120% for a $\frac{5}{32}$ inch diameter sample, and an elastic limit of about 11%. It will thus be seen that functional properties akin to the EEA and EVA materials have been obtained by substantially increasing the percent of voids and reducing the size of the pores forming the voids.

To form a welt cord, the rod of foamed core material 10 is sheathed in a web material 11, so as to encase the core within the circumambient portion 11a of the web, and this web may then be stitched, if desired, at 12, leaving an edging portion 11b running along the length of the welt cord. This edging provides the means by which the welt cord is attached to the web material with which it is to be used. The stitching 12 may be omitted, relying on manipulation of the core 10 and covering 11 to encase the core and form the edging 11b while the welt cord is being applied to the sheet material with which it is used.

Figure 3:
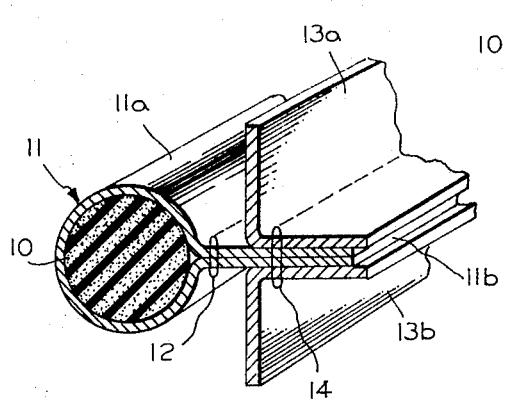
FIG. 3 is a cross sectional and perspective view of welt cord used as a seam covering.

Use of the welt cord to conceal a seam is shown in FIG. 3. A seam 14 is formed between two sheets or webs of material 13a and 13b. In order to conceal this seam, at the time it is formed, the edging portion 11b of the welt cord is inserted between the sheet sections 13a and 13b, and is sewn in place by the seam 14. The elongate rod-like portion of the welt cord, formed by the core 10 and covering portion 11a thus conceals the seam 14, giving a finished appearance to the seam area and protecting it against damage and abuse.

Figure 4:
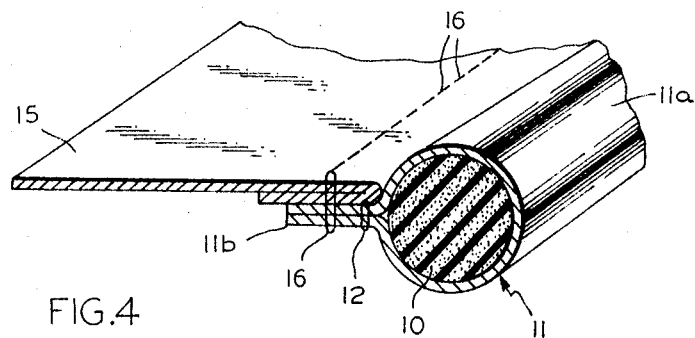
FIG. 4 is a cross sectional and perspective view of welt cord used as an edging.

As mentioned previously, the welt cord may also be used to finish an edge of a sheet of material, as illustrated in FIG. 4. The sheet 15 is folded at its edge, and the edging portion 11b of the welt cord is secured therealong by means of a row of stitching 16. In this manner the edge of the sheet material is given a finished appearance, and the elongate piping portion of the welt cord gives body to the edge of the material.

As stated earlier, there is some difficulty in obtaining extrudates with the high percentage of voids and small pore size herein contemplated. In part the problems stem from collapse of the foamed extrudate due to improper cooling. For example, if the exterior cools and contracts before the internal portion of the foam has set sufficiently, the core will tend to collapse and form a stiff outer layer. Also if the cooling is not uniform around the perimeter of the extrudate, the cross sectional shape of the extrudate will change.

Figure 5:
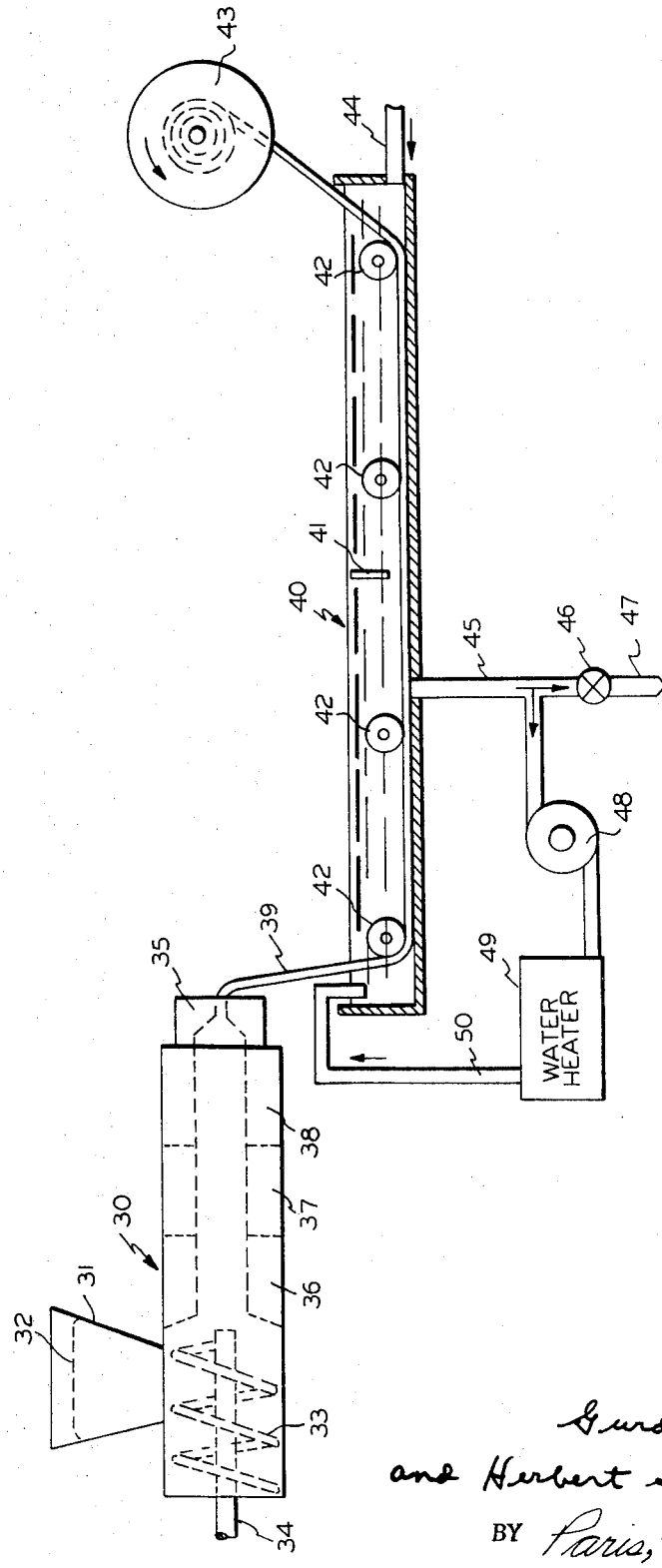
FIG. 5 is a schematic diagram of an extruder, cooling trough, and take-up reel utilized in producing welt cord core material in accordance with the present invention.

In FIG. 5 there is illustrated a system used for forming the very high percent voids material utilized in the practice of the present invention. An essentially conventional extruder is schematically indicated by the numeral 30, comprising a hopper 31 for holding a supply 32 of blended plastic molding powder and blowing agent. The hopper 31 feeds the molding mixture 32 into a screw drive 33 operated by means of shaft 34. The molding mixture is thus forced under pressure by the screw 33 into the heating zones 36, 37, and 38, and finally into the heated nozzle 35, from whence the molten mixture is extruded, and the extrudate expands after the release of compression force into the rod-like form of extrudate 39.

This expanded extrudate is fed into a water cooling trough 40, which contains a weir or dam 41 approximately at its center, and a number of submersion rolls 42. The extrudate 39 emerging from the extruder 30 is fed along the water trough 40 and thence to the take-up reel 43. Since the foamed extrudate is lighter than water it will normally float; but it is oftentimes necessary to submerge the extrudate at various points along the trough, or along the entire length of the trough to facilitate proper and uniform cooling of the material. Therefore, the submersion rolls 42 are provided at strategic intervals along the trough for this purpose.

A cold water inlet 44 is provided at the end of the trough remote from the extruder, and drain 45 is provided at a selected point near the middle of the trough. Thus as water is introduced at 44, a corresponding amount is withdrawn at 45 through valve 46 to drain 47. At the same time, a certain portion of the water drain at 45 is fed by pump 48 to water heater 49; thence hot water is returned to the trough through pipe 50 to the end of the trough adjacent the extruder 30. With this arrangement it will be appreciated that hot water enters the trough at the end where the extrudate enters, and flows in the same direction as the movement of the extrudate along the trough. At the same time, cold water enters the trough at the end from which the extrudate is withdrawn from the trough and flows in the opposite direction from the direction of movement of the extrudate along the trough. The intermingling of these two flows causes a temperature gradient of hot to cold along the path of movement of the extrudate. The rate of feed of hot and cold water into the trough, and the positioning of drain 45 and the weir 41 all cooperate to establish the desired temperature conditions along the trough.

The optimum conditions for operation of the extruder and the cooling trough depend upon various factors of the resin and extrudate, such as the particular thermoplastic resin employed, the diameter of the extrudate 39, and the percent voids therein. In the case of the specific polyethylene example given above, the following approximate operating conditions of the system will serve as a guide to optimizing a specific run: extruder temperatures at zone 36—310° F., at zone 37—380° F., at zone 38—420° F., at the nozzle 35—400° F.; a head pressure in the extruder of at least 600 p.s.i.; trough 40 being 40 feet long, with weir or dam 41 approximately in the middle, hot water input at 50 being 80° C. cold water input at 44 being 10° C., temperature at 41 being 50° C.; extrudate feed being at 210 ft./in.; the extruder orifice being 0.80 inch to yield extrudate products ranging from about 3/32 to 5/32 inch in diameter, depending on the rate of extruder screw operation.

Accordingly, there is presented by way of illustration several specific welt cord cores pursuant to the present invention. Numerous modifications and variations of these illustrative examples will be apparent to those skilled in the art; therefore, it is not intended that the present invention be construed as limited to the details of these examples, but such variations and modifications as are embraced by the spirit and scope of the appended claims are contemplated as being within the purview of the present invention.

What is claimed is:

1. A welting core of extruded foamed plastic consisting essentially of polyethylene, and having about 80% voids and an average pore diameter of about 8 mils.

2. A welting cord comprising a core as set forth in claim 1, and a covering overlying said core providing means for securing the cord to a fabric.

3. A welting core as set forth in claim 1, wherein said core has an elastic deformation limit of about 11%, and a tensile strength of about 180 p.s.i.

4. A welting cord comprising a core as set forth in claim 3, and a covering overlying said core providing means for securing the cord to a fabric.

5. A welting core of extruded foamed plastic consisting essentially of a polymer selected from the group consisting of ethylene ethyl acrylate and ethylene vinyl acetate, having about 70% voids and an average pore diameter of about 25 mils.

6. A welting core as set forth in claim 5, and further including polypropylene blended with said plastic in an amount up to about 10%.

7. A welting core as set forth in claim 6, wherein said core has an elastic deformation limit of between about 4 and 8%, and a tensile strength of about 270 p.s.i.

8. A welting cord comprising a core as set forth in claim 6, and a covering overlying said core providing means for securing the cord to a fabric.

9. A welting cord comprising a core as set forth in claim 7, and a covering overlying said core providing means for securing the cord to a fabric.

10. A welting core as set forth in claim 5, wherein said core has an elastic deformation limit of between about 8 and 12%, and a tensile strength of between about 265 and 290 p.s.i.

11. A welting core comprising a core as set forth in claim 10, and a covering overlying said core providing means for securing the cord to a fabric.

12. A welting cord comprising a core as set forth in claim 5, and a covering overlying said core providing means for securing the cord to a fabric.

References Cited

UNITED STATES PATENTS

| | | | |
|---|---|---|---|
| 2,932,121 | 4/1960 | Weitzel | 161—143X |
| 3,118,161 | 1/1964 | Cramton | 264—54X |
| 3,214,234 | 10/1965 | Bottomley | 264—54X |
| 3,251,728 | 5/1966 | Humbert | 260—2.5X |
| 3,303,045 | 2/1967 | Newman | 264—54X |
| 3,310,617 | 3/1967 | Dygert | 264—176 |
| 3,315,455 | 4/1967 | Stoller | 57—144 |

JOHN T. GOOLKASIAN, Primary Examiner

L. T. KENDELL, Assistant Examiner

U.S. Cl. X.R.

161—159, 178; 260—2.5; 264—54, 178